(12) United States Patent
Paycher et al.

(10) Patent No.: US 8,774,718 B2
(45) Date of Patent: Jul. 8, 2014

(54) METHOD AND DEVICE TO SYNCHRONIZE BLUETOOTH AND LTE/WIMAX TRANSMISSIONS FOR ACHIEVING COEXISTENCE

(75) Inventors: Alon Paycher, Beith Hananya (IL); Yaniv Tzoreff, Jerusalem (IL); Shlomit Moissa, Hod Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 288 days.

(21) Appl. No.: 13/434,948

(22) Filed: Mar. 30, 2012

(65) Prior Publication Data

US 2013/0260687 A1  Oct. 3, 2013

(51) Int. Cl.
*H04W 88/06* (2009.01)

(52) U.S. Cl.
USPC ............... 455/41.2; 455/552.1; 375/295

(58) Field of Classification Search
CPC ............ H04W 88/06; H04W 52/0209; H04M 2250/02; H04M 2250/06
USPC ........................................... 455/41.2
See application file for complete search history.

(56) References Cited

U.S. PATENT DOCUMENTS

| | | | | |
|---|---|---|---|---|
| 6,577,872 B1 * | 6/2003 | Lundh et al. | ................... | 455/502 |
| 6,990,082 B1 * | 1/2006 | Zehavi et al. | ................... | 370/280 |
| 7,142,880 B2 * | 11/2006 | Schmandt et al. | ........... | 455/515 |
| 7,725,118 B2 * | 5/2010 | Yang et al. | ..................... | 455/502 |
| 7,768,981 B1 * | 8/2010 | Donovan et al. | .............. | 370/338 |
| 7,809,399 B2 * | 10/2010 | Lu et al. | ..................... | 455/550.1 |
| 7,929,912 B2 * | 4/2011 | Sherman | ...................... | 455/41.2 |
| 8,086,213 B1 * | 12/2011 | Wong et al. | ................. | 455/343.1 |
| 8,094,631 B2 * | 1/2012 | Banerjea et al. | .............. | 370/338 |
| 8,121,144 B2 | 2/2012 | Bitran | | |
| 8,155,055 B2 * | 4/2012 | Haartsen et al. | .............. | 370/328 |
| 8,160,001 B2 * | 4/2012 | Bitran | .......................... | 370/328 |
| 8,160,032 B2 * | 4/2012 | Yang et al. | ..................... | 370/336 |
| 8,169,998 B2 * | 5/2012 | Fischer et al. | ................. | 370/350 |
| 8,189,710 B2 * | 5/2012 | Guo et al. | ..................... | 375/295 |

(Continued)

FOREIGN PATENT DOCUMENTS

WO    2011123531    10/2011

OTHER PUBLICATIONS

Specification of the Bluetooth System, Core System Package [BR/EDR Controller volume] Covered Core Package Version 4.0 [vol. 2] (Jun. 30, 2010) pp. 1-4 and 281-284.

*Primary Examiner* — Hai V Nguyen
(74) *Attorney, Agent, or Firm* — Ronald O. Neerings; Wade James Brady; Frederick J. Telecky, Jr.

(57) ABSTRACT

A communication unit has BT and LTE transceivers, and a BT processor. The BT processor sets up a BT connection over the BT transceiver; performs a legacy command to synchronize BT transactions over the BT connection based on LTE frames in a LTE connection over the LTE transceiver, so that a BT network clock is synchronized to LTE frames. The legacy command is a role switch command that is used to set a BT alignment time of a switch point between Bluetooth master/slave packets to a LTE switch between transmit and receive; and is specified in a BT Core Specification 4.0 or earlier. The processor can determine an expected alignment time to align BT master and slave packets to transmit and receive in the LTE frame based on a start time of the LTE frame, and can indicate the expected alignment time in the legacy command.

20 Claims, 5 Drawing Sheets

(56) References Cited

U.S. PATENT DOCUMENTS

| | | | |
|---|---|---|---|
| 8,204,036 B2 * | 6/2012 | Russell et al. | 370/350 |
| 8,218,516 B1 * | 7/2012 | Donovan et al. | 370/338 |
| 8,219,142 B2 * | 7/2012 | Khairmode et al. | 455/552.1 |
| 8,233,470 B2 * | 7/2012 | Yang et al. | 370/350 |
| 8,270,342 B2 * | 9/2012 | Yang et al. | 370/324 |
| 8,412,263 B2 * | 4/2013 | Sudak | 455/552.1 |
| 8,447,350 B2 * | 5/2013 | Khairmode et al. | 455/552.1 |
| 8,619,739 B1 * | 12/2013 | Donovan et al. | 370/338 |
| 2005/0201340 A1 * | 9/2005 | Wang et al. | 370/337 |
| 2006/0003802 A1 * | 1/2006 | Sinai | 455/553.1 |
| 2006/0072525 A1 | 4/2006 | Hillyard et al. | |
| 2006/0128308 A1 | 6/2006 | Michael et al. | |
| 2007/0161385 A1 * | 7/2007 | Anderson | 455/502 |
| 2007/0223430 A1 * | 9/2007 | Desai et al. | 370/338 |
| 2007/0232358 A1 * | 10/2007 | Sherman | 455/560 |
| 2007/0275746 A1 * | 11/2007 | Bitran | 455/509 |
| 2008/0181155 A1 | 7/2008 | Sherman et al. | |
| 2008/0205365 A1 * | 8/2008 | Russell et al. | 370/341 |
| 2008/0247367 A1 * | 10/2008 | Guo et al. | 370/338 |
| 2008/0267160 A1 | 10/2008 | Ibrahim et al. | |
| 2009/0073870 A1 * | 3/2009 | Haartsen et al. | 370/216 |
| 2009/0137206 A1 | 5/2009 | Sherman et al. | |
| 2009/0233551 A1 * | 9/2009 | Haartsen et al. | 455/41.3 |
| 2009/0298420 A1 * | 12/2009 | Haartsen et al. | 455/3.06 |
| 2009/0312010 A1 * | 12/2009 | Hall | 455/426.1 |
| 2010/0011128 A1 | 1/2010 | Paycher et al. | |
| 2010/0041330 A1 * | 2/2010 | Elg | 455/3.06 |
| 2010/0112950 A1 * | 5/2010 | Haartsen et al. | 455/41.3 |
| 2010/0137025 A1 | 6/2010 | Tal et al. | |
| 2010/0142500 A1 * | 6/2010 | Sudak | 370/338 |
| 2010/0165962 A1 | 7/2010 | Tzoreff et al. | |
| 2010/0203832 A1 | 8/2010 | Russell et al. | |
| 2011/0097998 A1 * | 4/2011 | Ko et al. | 455/41.2 |
| 2011/0216755 A1 | 9/2011 | Ibrahim et al. | |
| 2012/0044919 A1 * | 2/2012 | Medapalli et al. | 370/338 |
| 2012/0230303 A1 * | 9/2012 | Guo et al. | 370/336 |
| 2013/0155931 A1 * | 6/2013 | Prajapati et al. | 370/311 |
| 2013/0163643 A1 * | 6/2013 | Hirsch et al. | 375/137 |
| 2013/0176997 A1 * | 7/2013 | Tian et al. | 370/336 |
| 2013/0196643 A1 * | 8/2013 | Medapalli et al. | 455/418 |
| 2013/0260687 A1 * | 10/2013 | Paycher et al. | 455/41.2 |
| 2013/0295987 A1 * | 11/2013 | Khairmode et al. | 455/552.1 |

* cited by examiner

METHOD AND DEVICE TO SYNCHRONIZE BLUETOOTH AND LTE/WIMAX TRANSMISSIONS FOR ACHIEVING COEXISTENCE

TECHNICAL FIELD

The technical field relates in general to communication networks, and more specifically to a communication unit that operates simultaneously in two different communication networks.

BACKGROUND

Radio devices can be equipped with both Bluetooth and broadband wireless technologies such as WiMAX or LTE which are used by 4G networks, Several common usage cases require the simultaneous operations of co-located, Bluetooth (BT) and LTE/WiMax radios, such as the use of a BT headset on a cellular phone using LTE communications.

BT and LTE/WiMax operate in adjacent bands, causing mutual interferences. In order to coexist together, the BT transactions should be synchronized to the LTE/WiMax frames, in a way where both TX and RX of the two technologies are performed simultaneously.

The problem is to allow coexistence of these two wireless technologies. The reason they cannot coexist is that they use adjacent frequencies which are close to each other in the frequency domain, which block each other. When one transmits, the other cannot receive, and vice-versa. The fundamental issue is that both technologies use very, very close frequency bands and they have coexistence issues. The LTE, which is cellular technology, uses band 40 and band 7, which are closely adjacent to the BT band. As the LTE and BT bands get close to each other, the co-existence problems increase. The problem is to make these two technologies work together.

To address this problem, the Bluetooth Special Interest Group (BT SIG) has defined two ways to adjust the Bluetooth network clock (BT CLK) that controls timing of network communications while in active connection. First, new devices (that is, according to the next Bluetooth standard after the BT 4 specification, commonly referred to as BT Core 4.1 or further) will use a new dedicated BT command. Second, legacy devices (that is, according to the current BT 4 specification or earlier) can drift the BT network clock for a long period up to the required BT CLK change.

SUMMARY

Accordingly, one or more embodiments provide a method, a system, and/or a communication unit having a BT transceiver, a LTE transceiver, and a processor cooperatively operable with the BT transceiver. The processor is configured to set up a BT connection over the BT transceiver; and to perform a legacy command to synchronize BT transactions over the BT connection to LTE frames in a LTE connection over the LTE transceiver, instead of waiting for the BT transactions to synchronize to the LTE frames, when the communication unit is acting as BT master, whereby a BT network clock is synchronized to LTE frames transmitted over the LTE transceiver. In one or more embodiments, the legacy command is a role switch command that is used to set a BT alignment time of a switch point between Bluetooth master/slave packets to a LTE switch between transmit and receive. In another embodiment, the legacy command is specified in a BT Core Specification 4.0 or earlier. In yet a further embodiment, the legacy command comprises a first link layer role switch command to move to slave and then a second link layer role switch command to move to master. In yet another embodiment, the legacy command is a role switch command formatted according to a Bluetooth link layer standard. In still another embodiment, the processor determines an expected alignment time to align BT master and slave packets to transmit and receive in the LTE frame based on a start time of the LTE frame, and the processor indicates the expected alignment time in the legacy command. In still another embodiment, the processor determines an expected alignment time to align BT master and slave packets to transmit and receive in the LTE frame based on a start time of the LTE frame, and the legacy command is performed twice to switch the communication unit role to BT slave and then back to BT master while uploading the expected alignment time to the BT network clock.

Further embodiments provide a method, a system, or a device such as a communication unit for coexistence of BT and LTE networks on a same communication unit. The method includes setting up a BT connection over a BT transceiver on a communication unit. The method also includes performing, on the communication unit, a legacy command to synchronize BT transactions over the BT connection to LTE frames in a LTE connection over an LTE transceiver on the communication unit, instead of waiting for the BT transactions to synchronize to the LTE frames, when the communication unit is acting as BT master, whereby a BT network clock is synchronized to LTE frames transmitted over the LTE transceiver. In another embodiment, the legacy command is a role switch command that is used to set a BT alignment time of a switch point between Bluetooth master/slave packets to a LTE switch between transmit and receive. In still another embodiment, the legacy command is specified in a BT Core Specification 4.0 or earlier. According to a further embodiment, the legacy command comprises a first link layer role switch command to move to slave and then a second link layer role switch command to move to master. In yet another embodiment, the legacy command is a role switch command formatted according to a Bluetooth link layer standard. Another embodiment includes determining, in the communication unit, an expected alignment time to align BT master and slave packets to transmit and receive in the LTE frame based on a start time of the LTE frame, and indicating the expected alignment time in the legacy command. Still another embodiment includes determining, in the communication unit, an expected alignment time to align BT master and slave packets to transmit and receive in the LTE frame based on a start time of the LTE frame, and performing the legacy command twice to switch the communication unit role to BT slave and then back to BT master while uploading the expected alignment time to the BT network clock.

Yet another embodiment provides for methods, systems, devices, and/or a non-transitory computer-readable medium comprising instructions for execution by a computer, the instructions including a computer-implemented method for coexistence of BT and LTE networks on a same communication unit. This embodiment can include setting up a BT connection over the BT transceiver; determining an expected alignment time to align BT master and slave packets based on a LTE frame based on a start time of a next LTE frame, and inserting the expected alignment time in a legacy command; and performing the legacy command with the expected alignment time to synchronize BT transactions over the BT connection to transmit and receive in the LTE frames in a LTE connection over the LTE transceiver. In accordance with yet another embodiment, the legacy command is a role switch command that is used to upload the expected alignment time to the Bluetooth network clock. According to still another embodiment, the legacy command is specified in a BT Core Specification 4.0 or earlier. According to yet another embodiment, the legacy command is a role switch command formatted according to a Bluetooth link layer standard. In accordance with still another embodiment, the legacy command comprises a first link layer role switch command to move to slave and then a second link layer role switch command to move to master. Another embodiment provides for performing the legacy command twice to switch the communication unit role to BT slave and then back to BT master while uploading the expected alignment time to the BT network clock.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
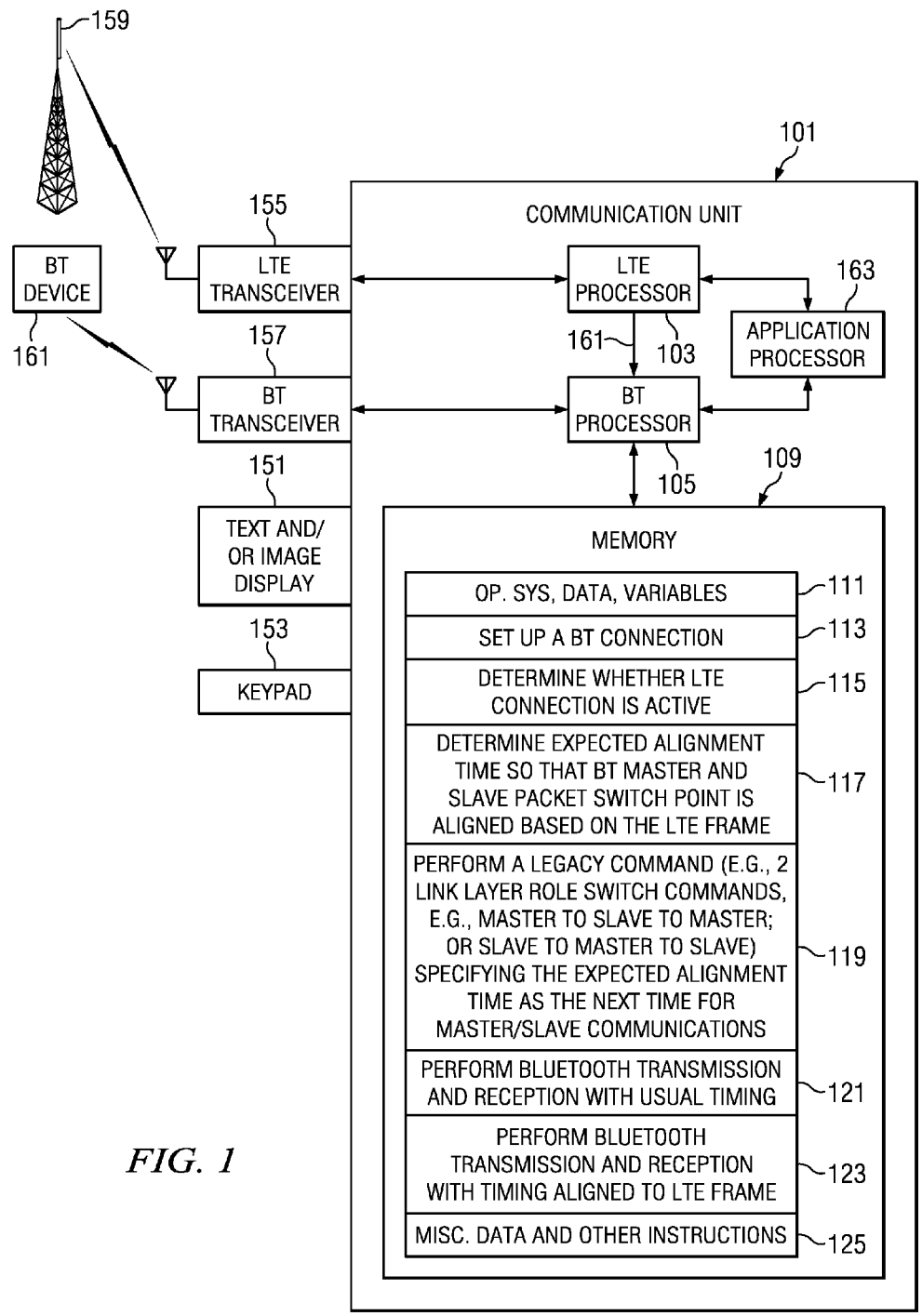
FIG. 1 is a block diagram illustrating portions of a communication unit.

In overview, the present disclosure concerns wireless communications devices or units, often referred to as communication units, such as cellular phone or two-way radios and the like having simultaneous Bluetooth and LTE operating capability, such as associated with a communication unit having an associated Bluetooth device on a communication system such as a 4G network, an Enterprise Network, a cellular Radio Access Network, or the like. Such communication systems may further provide services such as voice and data communications services. More particularly, various inventive concepts and principles are embodied in systems, communication units, and methods therein for providing coexistence of simultaneous Bluetooth and LTE communications on the same communication unit.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to synchronize both Bluetooth and LTE technologies, because if both transmitters act simultaneously there will be no coexistence issues. What has not been appreciated is that the conventional BT role-switch command can be used to achieve the alignment of (i) BT master to LTE transmit and (ii) BT slave to LTE receive. Specifically, the sequence of performing the link layer role-switch command for the purpose of aligning the BT to the LTE is not known.

Further in accordance with exemplary embodiments, a link layer role switch command is performed twice at the communication unit, specifying the time of the alignment, which causes the BT network clock to be updated as specified so that the Bluetooth master-slave switch point is aligned to LTE transmit/receive pair based on the end of the LTE frame. For legacy devices, instead of having a long drift for several seconds or minutes, or instead of simply communicating as usual despite the interference, the role switch command, which is a legacy command, can be used to change the BT network clock for the heretofore unknown purpose of aligning BT and LTE communications, e.g., aligning the timing of the BT packet switch between transmit and receive to the timing when the LTE packets switch between transmit and receive, based on the LTE end/start of frame. The BT network clock change using the role switch command can be accomplished in less than 10 msec time frame. More particularly with regard to the role switch procedure, the primary purpose of the role switch procedure is to change the master and slave roles, however, there is a known option in the role switch procedure to specify a next time that the master and slave expect to communicate with each other which is used for the previously unknown function of re-timing the BT network to the LTE network.

As detailed further below, the role switch procedure can be performed as follows: while the BT is acting as master, the command is performed twice, first moving to slave role, and the second back to master role, but specifying new BT network clock that is now timed based on the LTE frame. As a result of this procedure, the BT network clock will be already synchronized to the LTE/WiMax frames so that pairs of BT transmit/receive communications are timed to coincide with pairs of LTE transmit/receive communications, at least once per LTE frame.

Figure 2:
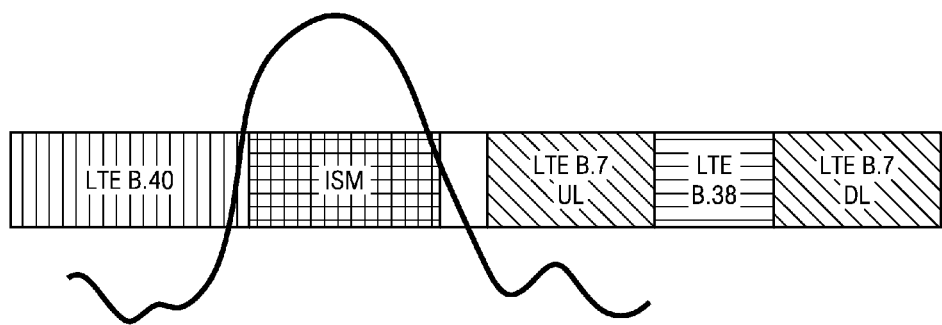
FIG. 2 is a diagram illustrating frequencies that must coexist on a handset.
Figure 3:
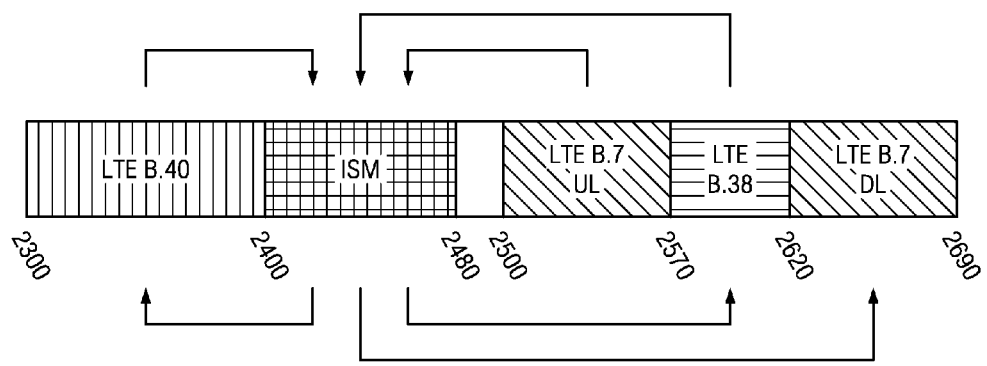
FIG. 3 is another diagram illustrating frequencies that must coexist on a handset.

Referring now to FIG. 2 and FIG. 3, two diagrams illustrating frequencies that must coexist on a handset will be discussed and described. As an example, consider a cellular phone that has both LTE and BT technologies inside the phone, in which LTE (4G cellular) and Bluetooth must coexist. The LTE Band 40 (RDD), Band 7 (FDD) and Band 38 (TDD) reside adjacent to the ISM band which is used for Bluetooth, as illustrated. Especially, Band 40 has 0 MHz frequency separation from the start of the ISM band used by Bluetooth. The blocking or the coexistence issues will occur if both technologies are implemented in the cellular phone. If there is a cellular handset with LTE working at band 7 and band 40 (the problematic bands), there will be co-existence issues. RF solutions such as band pass filters cannot be used when no frequency separation exists and as a result, time-domain techniques need to be applied to allow coexistence of Bluetooth and LTE.

Figure 4:
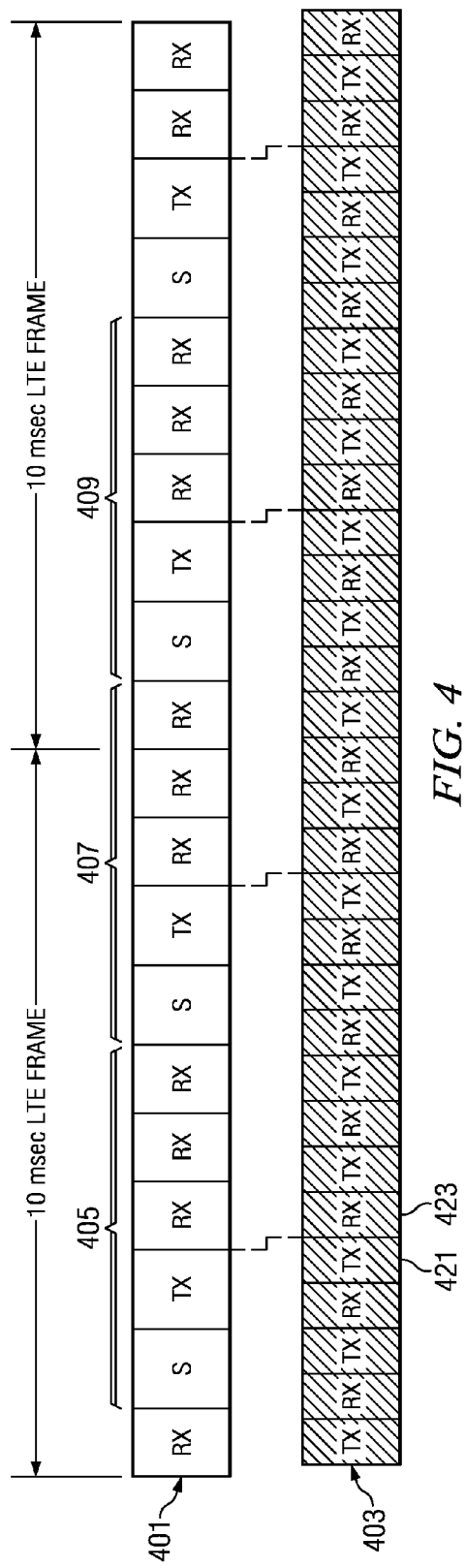
FIG. 4 is timing diagram illustrating Bluetooth and LTE transmission and reception times.
Figure 5:
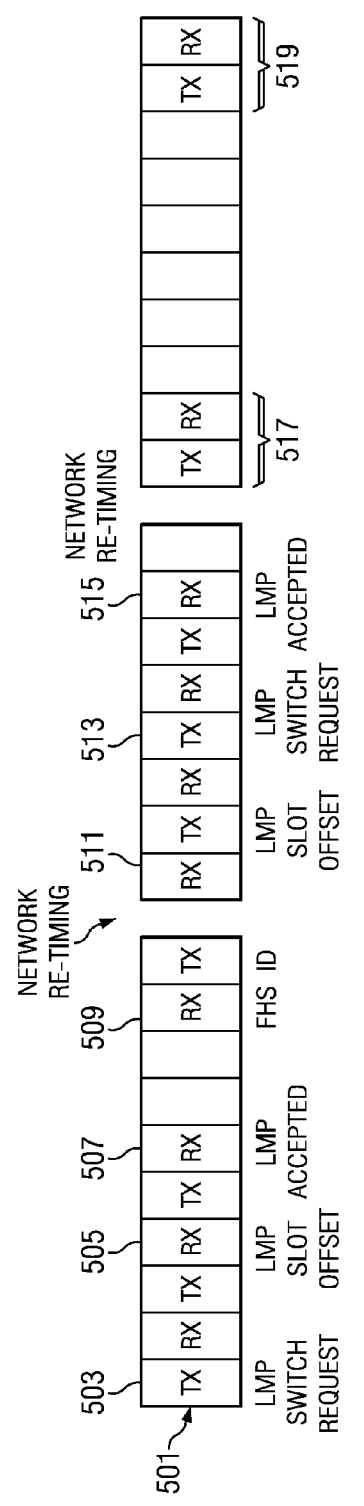
FIG. 5 is a diagram illustrating a packet sequence to align the BT network to the LTE.
Figure 6:
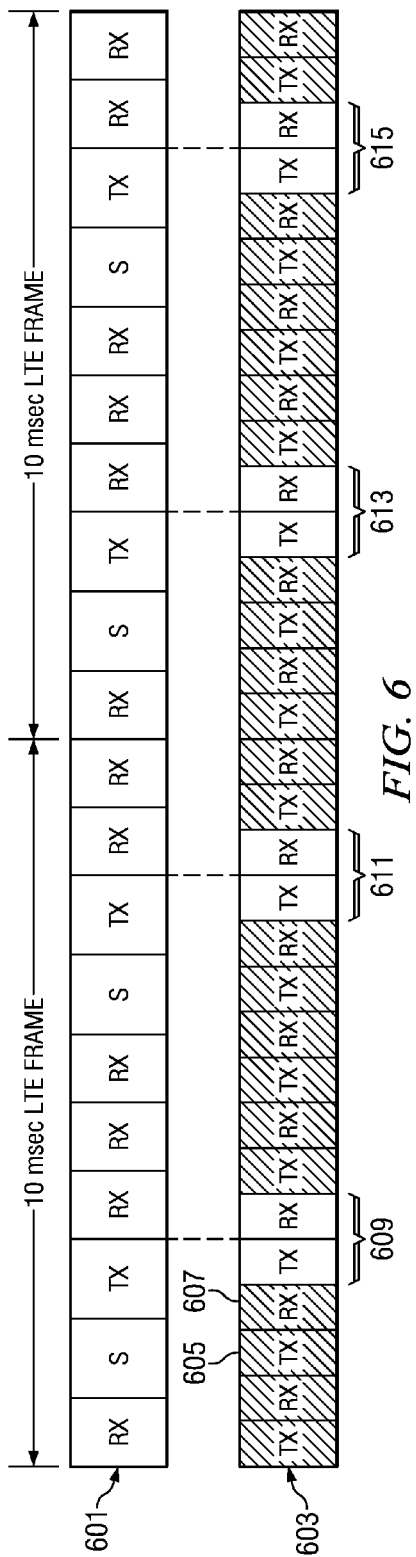
FIG. 6 is a timing diagram illustrating Bluetooth and LTE transmission and reception times with co-existence.

As an example, the issues with co-existence arise when a conventional cellular handset has both an LTE chipset and a BT chipset. Each one of the chipsets has a receiver and a transmitter (conveniently referred to as a "transceiver"). At a certain time the transceiver can either receive or transmit. FIG. 4 provides an example illustration of the coexistence problem, FIG. 5 provides an illustration of a packet sequence to align LTE and BT, and FIG. 6 provides a comparative example illustration of the solution discussed herein. Discussion follows.

Referring now to FIG. 4, a timing diagram illustrating Bluetooth and LTE transmission and reception times will be discussed and described. Here, a communication device is equipped with both BT and LTE which are experiencing interference. In FIG. 4, the top series illustrates LTE communications 401 (sometimes referred to as"MWS"). At certain periods there are reception (RX) communications and at others there are transmission (TX) communications. This is conventional LTE communications. One frame is conventionally 10 ms, and in this example consists of one TX communication followed by four RX communications. The frames 405, 407, 409 are sequential, and the timing of the frames is determined so as to match to a base station with which the device communicates.

Also, in this figure in the bottom series is illustrated a sequence of Bluetooth communications 403 with TX (transmit) 421 and receive (RX) 423 blocks, also referred to as a M/S pair (master/slave pair). BT transmissions occur in pairs of the TX and RX block during the BT slot 403. Bluetooth communications typically alternate between the slave and the master pairs. This will be for example, a BT equipped handset and a BT headset device. When one transmits, the other receives.

BT and LTE on the same communication unit are transmitting and receiving independently. If LTE and BT both transmit at the same time, there is no problem. If they both receive at the same time, there is no problem. But if one transmits and the other receives, then the Bluetooth communications experience interference.

In FIG. 4, the interference is indicated by the hatches marking a master-slave pair of Bluetooth communications, noticeable when there is a BT/LTE transmission and a reception simultaneously during at least one part of a master-slave pair of BT communications. The Bluetooth switch points between TX and RX 421, 423 pairs are never lined up with the LTE switch point between TX and RX, as shown by the dotted vertical lines In the Bluetooth slot 403, all of the Bluetooth MS pairs experience interference because in this example there is always LTE receive and BT transmit signal, or a LTE transmit and BT receive signal, which cannot coexist. The MS pairs fail because of the coexistence issue during either or both halves of the M/S pair.

The problem is to get the BT M/S pairs to line up to the LTE receive/transmit pairs. This can be thought of as lining up the end of the LTE frame 405, 407, 409, which is when LTE switches between transmit and receive, with the switch point which is between BT TX and RX blocks 421, 423, when the Bluetooth master/slave pair switches between master and slave.

Without aligning the Bluetooth network to the LTE network, the BT communications will collapse due to errors. The LTE network timing cannot be changed because it is aligned to the base station which cannot be adjusted by the communication unit. However, the BT network time can be changed to solve the problem. Time domain techniques for allowing Bluetooth/LTE coexistence are based on aligning Bluetooth and LTE transmission and reception times. Available Bluetooth devices do not have a straightforward way to alter their network time, and Bluetooth standards do not specify a command to alter the BT network clock. Using conventional techniques, a BT device would usually wait at least 10 seconds, and possibly up to several minutes, for both networks to align utilizing drift.

Referring now to FIG. 5, a diagram illustrating a packet sequence to align the BT network to the LTE will be discussed and described. To change the BT network time so that the Bluetooth switch points between transmit and receive are lined up with the point where LTE switches between transmit and receive, the conventional BT Role-switch procedure is used to switch between BT master and slave roles. However, the conventional BT role switch procedure is not used for its conventional purpose, but is instead used to change the BT network timing. As a side effect, which is not the main purpose, the conventional BT role switch procedure updates the BT network timing. When the BT handset and headset, for example, switch roles between them, the role switch procedure has an option as part of the procedure to update the timing. Here, the proper timing for the alignment is determined and then the BT role-switch is performed, not for its main purpose, but specifically to update the BT network clock so as to line up the switch points in the slot pairs to the ends of the LTE frames.

The BT Role-switch procedure is a known link layer procedure. The Bluetooth chipset, for example, can issue an LMP (Link Manager Protocol) switch role command to switch from master to slave, but as a side effect there is a possibility to upload new timing. The BT network time can be reloaded as a side effect of the command.

The BT Role-switch command is at the link layer level. It is denominated "role-switch", and is defined in the Link Manager Protocol Specification, for example, in section 4.4 of BT Core Specification 4.0, and also in earlier versions thereof. Section 4.2 of the Core Specification discusses link layer packets.

In FIG. 5, a BT slot 501 conventionally alternates between TX and RX pairs. A series of two role switch commands are issued to cause the BT network to align to the LTE network.

These commands are conventional, although the retiming information in the commands is not conventional Here, the following sequence of commands is issued:
  LMP Switch request 503
  LMP Slot Offset 505
  LMP Accepted 507
  FHS ID 509
  ... then the BT network re-times
  LMP Slot Offset 511, in which the LMP Slot Offset contains the retiming information to align to LTE UL:DL switch point
  LMP Switch Request 513
  LLMP Accepted 515
  ... then the BT network retimes
  Then conventional communication resumes with TX/RX pairs 517, 519, as discussed further in connection with FIG. 6.

Referring now to FIG. 6, a timing diagram illustrating Bluetooth and LTE transmission and reception times with co-existence, after being re-timed according to FIG. 5, will be discussed and described. As in FIG. 4, the top series illustrates LTE communications 601 and on the lower series illustrates a sequence of Bluetooth communications 603. Here, at least one BT transmit/receive pair is lined up with the LTE receive/transmit pair per frame so that they do not experience interference. The Bluetooth switch points between TX and RX 605, 607 pairs 609, 611, 613, 615 are lined up with the switch point between LTE TX and RX, as shown by the dotted vertical lines. Thus, at least some of the LTE receive transmissions are lined up with the receive half of the Bluetooth communication; and the corresponding LTE transmit transmissions are lined up with the transmit half of the Bluetooth communication pairs 609, 611, 613, 615. Some of the BT communications still experience interference, however, this is much less than the interference illustrated in the example of FIG. 4.

It is possible to rely on drift to retime Bluetooth and LTE transmission and reception times. In this situation, a device with both LTE and Bluetooth will drift the network clock for a long period up to the required BT clock change. Using drift in this manner can result in an undesirable use case because of the long delay waiting during the drift. The slow drift usually causes the network to disconnect because it is too slow.

Reference is made again to FIG. 4. In FIG. 4, BT communications experience interference and the BT communication ultimately may collapse due to errors.

Now comparing FIG. 4 to FIG. 6, more packets are successful in FIG. 6. However, in Bluetooth, it is an acceptable use case to successfully convey one pair of packets every 5 ms or so (corresponding to the LTE frame) and to drop or lose the packets which experience interference. This is manageable for typical Bluetooth uses such as e.g., a phone call. So, allowing packets to be sent at 30% of the optimum rate as is the case in FIG. 6 is acceptable to the user.

Figure 7:
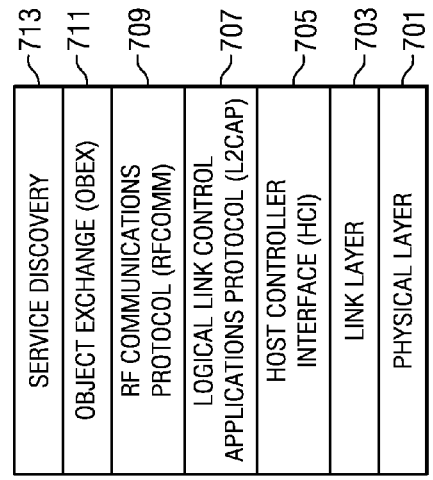
FIG. 7 is a block diagram illustrating Bluetooth protocol layers.

Referring now to FIG. 7, a block diagram illustrating Bluetooth protocol layers will be briefly discussed and described. In overview, a Bluetooth device includes a BT layered protocol which generally includes a physical layer 701, a link layer 703, a host controller interface (HCI) layer 705, a logical link control applications protocol layer (L2CAP) 707, an RF communications protocol layer (RFCOMM) 709, an object exchange (OBEX) layer 711, and a service discovery layer 713. Some of these layers can be omitted, augmented or combined according to known techniques. Each of these layers is generally known and will not be further described.

The link layer 703 is of interest here and is defined by the Link Manager Protocol Specification, and a known role switch procedure in the link layer 703 can be used with a previously unknown timing. In particular, a side effect of the link layer role switch procedure can be to line up the timing to a specified point, and to end up at the exact same state in the Bluetooth protocol. In this case, the side effect can be provided with pre-determined timing such that the BT network is lined up with the LTE network. There are other options for lining up the timing, such as slowly drifting the BT clock (discussed above) which takes up to several minutes. However, by using the BT role-switch procedure, the change can be performed in about ten ms.

The proposal herein can allow a BT headset according to BT Core Specification 4 or earlier (referred to herein sometimes as a "legacy" BT technology, "legacy" BT headset, or similar) to work with an LTE enabled cellular phone that has a BT transceiver. When a user buys a new cell phone, they may want their existing BT headset to work with the new cell phone. Most of the current solutions to the problem discussed herein are not compatible with legacy BT headsets but instead are additions to the BT protocol to solve this issue. For example, currently the BT SIG is working on defining "LTE compatible" Bluetooth devices; the assumption so far is that "LTE compatible" Bluetooth devices will work only with another "LTE compatible" device that accommodates heretofore undefined commands and not with a legacy device that does not accommodate these new commands. This means that a user of a new LTE enabled cellular phone would need to purchase a new headset instead of being able to use their legacy Bluetooth headset.

The proposal herein, however, can be a simple change on the BT chipset that does not force any change of the BT headset but just piggybacks the new alignment timing on the conventional role-switch command. Consequently, use of this scheme will support the legacy headsets and other legacy BT technology. Thus, a purchaser of an LTE enabled handset can continue to use a favorite conventional Bluetooth headset.

Referring now to FIG. 1, a block diagram illustrating portions of a communication unit will be discussed and described. FIG. 1 is a block diagram of an exemplary communication device for use in operation of one or more embodiments. The communication device 101 may include an LTE processor 103 and an LTE transceiver 155; a BT processor 105 and a BT transceiver 157; an application processor 163; a memory 109 in communication with the BT processor 105; a microphone (not illustrated), a text and/or image display 151, a speaker (not illustrated), and/or a user input device such as a keypad 153.

The LTE processor 103 and BT processor 105 each may comprise one or more microprocessors and/or one or more digital signal processors. Portions associated with the LTE processor 103 have been omitted for simplification. Many other portions of the BT and LTE technology and conventional portions of a communication unit are well known and have been omitted to avoid obscuring the discussion. The memory 109 may be coupled to or incorporated in the BT processor 105 and may comprise a read-only memory (ROM), a random-access memory (RAM), a programmable ROM (PROM), and/or an electrically erasable read-only memory (EEPROM). The memory 109 may include multiple memory locations for storing, among other things, at least a rudimentary operating system, data and variables 111 for programs executed by the BT processor 105; computer programs for causing the BT processor to operate in connection with various functions such as to set up 113 a BT connection, to determine 115 whether the LTE connection is active, to determine 117 the expected alignment time, to perform 119 a legacy command or role switch command that specifies the expected alignment time, to perform 121 BT transmission/ reception with the usual timing, to perform 123 BT transmission/reception with timing aligned to the LTE frame, and/or other processing; and a data storage 123 for other information used by the BT processor 105. The computer programs may be stored, for example, in ROM or PROM and may direct the BT processor 109 in controlling the operation of at least the BT portion of the communication device 101. Each of these functions is considered in more detail herein.

In the communication device 101, there may be at least two chipsets which are not synchronized, one for LTE and one for Bluetooth, and each chipset has their own processor, such as the LTE processor 103 and the BT processor 105. There may also be an application processor 163 controlling these two chipsets, but which is well understood and is not relevant for this discussion. The BT network clock discussed herein is conventionally implemented as a virtual clock different from the hardware clock that is attached to the BT transceiver itself. The BT network clock is what is synchronized to the LTE as discussed herein.

The LTE processor 103 may transmit and receive communications to/from a LTE network infrastructure device 159 such as a base station via an optional LTE RF front end (not illustrated) over the LTE transceiver 155, according to known techniques and LTE communication standards. Using known techniques, the LTE processor 103 can send timing information 161 to the BT processor 105 that indicates among other things the timing for the frames, specifically, the reference timing signal for frame boundary that the LTE sends as is conventional.

The BT processor 105 can use the timing information 161 from the LTE processor as further discussed herein to allow the capture offset needed to align the BT network to the LTE processor.

The user may invoke functions accessible through the keypad 153 or other user input device. The user input device may comprise one or more of various known input devices, such as a keypad, a computer mouse, a touchpad, a touch screen, a trackball, and/or a keyboard. The display 151 may present information to the user by way of a conventional liquid crystal display (LCD) or other visual display, and/or by way of a conventional audible device (e.g., a speaker) for playing out audible messages.

Responsive to signaling from the user input device 153, in accordance with instructions stored in memory 109, or automatically upon receipt of certain information via the BT transceiver 157, the BT processor 105 may communicate information to or from a BT device 161 over the BT transceiver 157 according to known techniques and BT standards.

The BT processor 105 may be programmed to set up 113 a BT connection, in accordance with known techniques. The BT processor can initiate the active connection, or can respond to a request for the BT active connection. The BT processor on the communication device does not have to initiate the active BT connection. Techniques for setting up an active BT connection are known for requesting and acknowledging a request for the connection and exchanging any other necessary information to place the BT processor 105 in communication with the BT device 161.

The BT processor 105 may be programmed to determine 115 whether the LTE connection is active. This can be performed in accordance with known techniques. For example, a signal in one of the LTE bands can be detected, or the BT processor 105 can be informed by the LTE processor 103 over connection 161 that an LTE connection is active, or interference that occurred with a BT communication can be noted, or similar.

The BT processor 105 may be programmed to determine 117 the expected alignment time so that the BT master and slave packet switch point is aligned to the LTE frame. The offset timing for lining up the BT and LTE network, which is injected into the BT network clock to align it, can be determined using known techniques. For example, the LTE frame size is known and the actual end/beginning of a frame can be determined from a detected signal or can be indicated by the LTE processor 103 via communication signal 161; from this information the timing when the subsequent LTE frames will start/end can be determined. Also, the MS packet size can be determined from the requested BT communications, and the MS switch point can aligned to the end/beginning of the LTE frame by working backwards to when the MS packet pair should be commenced. In any event, there are several known methods for determining the alignment of transmit/receive switch point in the LTE frame to the MS switch point, and any of the methods can be used.

The BT processor 105 may be programmed to perform 119 a legacy command or role switch command that specifies the expected alignment time as the next time for master/slave communications. The legacy command can be, for example, a consecutive sequence of two link layer role switch command sets, either master to slave and then slave to master, or slave to master and then master to slave. The command is referred to as a "legacy command" because it exists in current technology, that is specified in a BT Core Specification 4.0 or earlier, to distinguish from a command that was not specified in BT Core Specification 4.0 or earlier which consequently a "legacy" device might not understand; the "legacy command" may continue to be defined in a later specification if it was defined earlier. The link layer role switch command and the associated sequence for the link layer role switch procedure is described in the BT specification and is well defined, conventional, and well understood. To be compatible not only with new devices but also with legacy BT devices, the commands can be as described in the specification. For example, a conventional role switch master to slave procedure is performed: a master to slave role switch packet is sent, an ACK is received (to accept the role switch), and then a packet is sent specifying the time to meet again, an ACK is received (to accept the time), etc. all as described in the specification. Then, the role switch slave to master is performed: a slave to master role switch packet is sent, an ACK is received (to accept the role switch), and then a packet is sent specifying the time to meet again, an ACK is received (to accept the time), etc. all as described in the specification. However, in contrast to the conventional role switch procedure, before the role switch from slave to master is performed, the expected alignment time to line up with LTE is calculated, and the expected alignment time is used as the time to meet again instead of the usual time.

Note, the expected alignment time is determined before performing at least the last role switch procedure because the role switch procedure allows for an indication of the next time to begin BT communications which is specified as described herein. The expected alignment time is inserted into the role switch procedure and consequently overrides the default time, if any, that may be specified.

The BT processor 105 may be programmed to perform 121 BT transmission and reception, for example to communicate with the BT device 161 over the BT transceiver 157 when an LTE connection is not active. Such transmission and reception can be performed with the usual timing. This can be done in accordance with conventional techniques.

The BT processor 105 may be programmed to perform 123 BT transmission and reception, for example to communicate with the BT device 161 over the BT transceiver 157 when an LTE connection is active. In this case, the timing of the BT transmission and reception timing can be aligned to the timing of the LTE transmit and receive based on the LTE frame by setting the BT network clock to the expected alignment time. In one situation, the BT network clock once aligned remains aligned and hence the BT transmission and reception thereafter can be performed as usual; any unaligned packets will experience interference and be dropped as usual but there is at least one master/slave packet pair that is aligned within each subsequent LTE frame. In another situation, the BT network clock remains aligned and a predetermined delay is inserted between MS packet pairs so that the MS packet switch point remains aligned to the LTE frames. In yet another situation, the BT network clock does not remain aligned to the LTE (perhaps the BT drifts or a new LTE connection is activated), and a role switch procedure is performed to reset the BT network clock to a new expected alignment time. However, once the BT transmission and reception timing is aligned to LTE transmit and receive based on the LTE frame, the BT transmission and reception can be performed in accordance with conventional techniques.

As will be understood in this field, besides the functions discussed above, the memory 109 can include other miscellaneous information in the misc. database 123, along with the usual temporary storage and other instructions for other programs not considered herein.

It should be understood that FIG. 1 is described in connection with logical groupings of functions or resources. One or more of these logical groupings may be omitted from one or more embodiments, for example, the keypad 153 and/or text/image display 151 can be omitted from the device. Likewise, functions may be grouped differently, combined, or augmented without parting from the scope. Similarly the present description may describe various collections of data and information. One or more groupings of the data or information may be omitted, distributed, combined, or augmented, or originated locally and/or remotely without departing from the scope.

Figure 8:
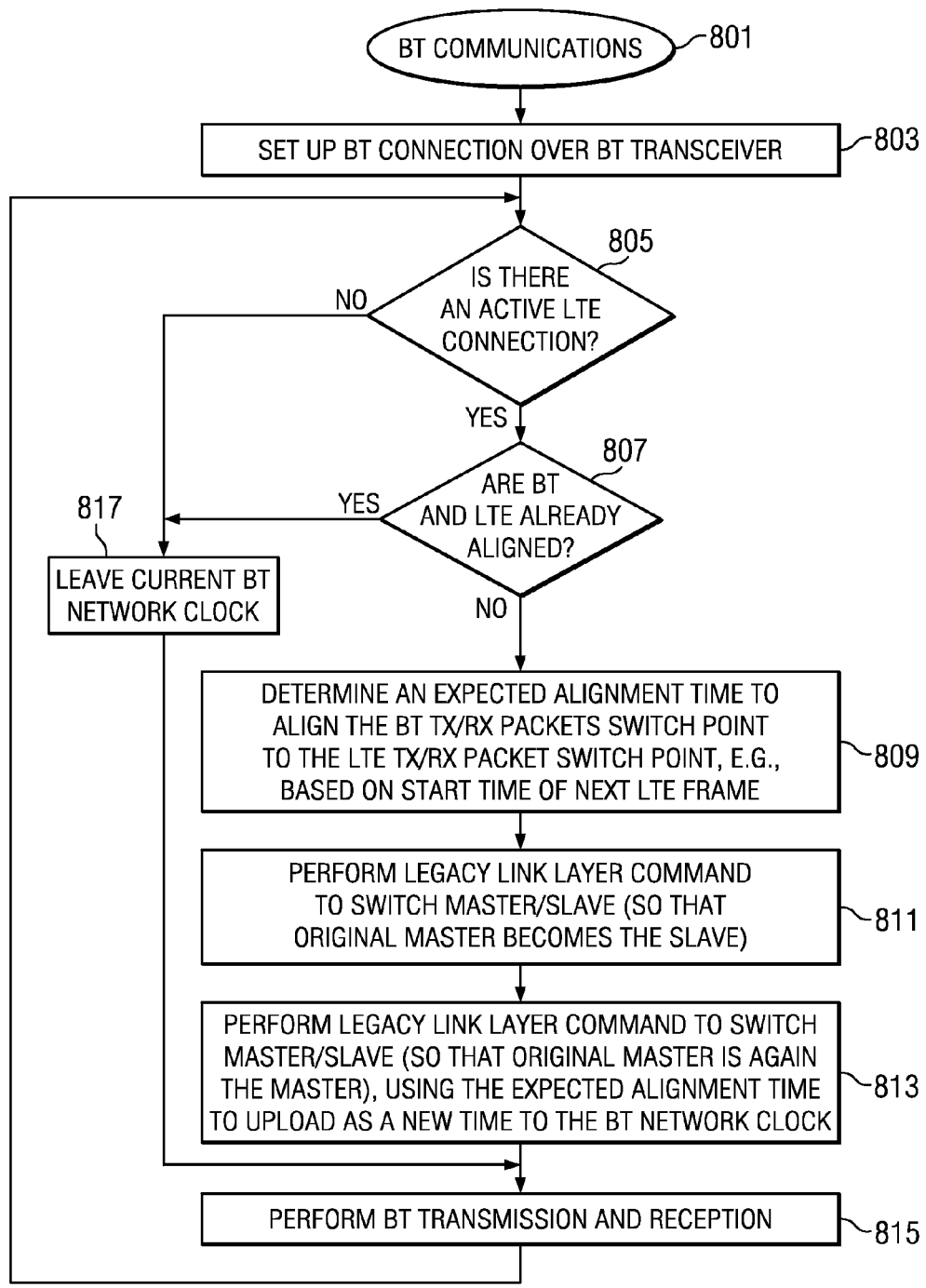
FIG. 8 is a flow chart illustrating a BT communications procedure.

Referring now to FIG. 8, a flow chart illustrating a BT communications procedure 801 will be discussed and described. The procedure can advantageously be implemented on, for example, a processor of a communication unit, described in connection with FIG. 1, or other apparatus appropriately arranged.

In overview, the BT communications procedure 801 can set up 803 the BT connection, check 805 whether there is an active LTE connection 805, and if so check 807 whether BT and LTE are already aligned. If there is an active LTE connection and BT and LTE are not aligned, then the procedure 801 can determine 809 the expected alignment time, perform 811 the link layer command to switch master/slave, perform 813 the link layer command (again) to switch master/slave and uploading the expected alignment time to the BT network clock. If BT and LTE are already aligned, or if there is no active LTE connection, then the procedure leaves 817 the BT network clock as already set—there is no reason to align the clock to LTE. Then, now that the BT connection is set up and the BT network clock is aligned (if necessary), the procedure 801 performs 815 BT transmission and reception. Many details relating to these have been described above, however, some additional discussion follows although previously discussed details may be omitted. The detailed discussion follows.

The procedure 801 can set up 803 the BT connection, as previously described. The procedure can initiate the BT connection, and/or can receive the request for the BT connection. Conventional techniques can be used.

The procedure 801 can check 805 whether there is an active LTE connection 805, as previously described, using known techniques.

The procedure 801 can check 807 whether BT and LTE are already aligned, that is, whether the BT transmit/receive packet switch point is already aligned with the LTE transmit/receive packet switch point based on the end or beginning of an LTE frame. The packet switch point can be determined as described above. Also, the determination of an LTE frame was described above; several techniques are known for making this determination. As shown in FIG. 8, this determination can be skipped if the LTE is not active.

In a situation that there is an active LTE connection and BT and LTE are not aligned, then the procedure 801 can determine 809 the expected alignment time based on the LTE frame. This has been discussed in detail above, and will not be repeated here.

The procedure 801 can perform 811 the link layer command to switch master/slave, so that the original master becomes the slave, and then the procedure performs 813 the link layer command (again) to switch master/slave so that the original master is again the master. The situation can be that the device running the procedure is currently a master and so the device performs the link layer procedure to role switch from master to slave. If this is the situation, then the second role switch procedure will be from slave to master. On the other hand, if the situation is that the device running the procedure 801 is currently a slave, the device performs the link layer procedure to role switch from slave to master; the second role switch procedure will be from master to slave. In any event, the first role switch command switches the roles of the original master and original slave, and the second role switch command switches the roles back to the original master and original slave.

When the procedure 801 performs 813 the second link layer command (again) to switch master/slave so that the original master is again the master, the procedure 801 takes advantage of a side effect to upload the expected alignment time as a new time to the BT network clock. As previously discussed, the role switch procedure (which calls for the LMP switch request and the LMP slot offset commands) provides an optional parameter that specifies a time to upload to the BT network clock which defines a fixed synchronization point in time at which the BT master and BT slave are synchronized. The expected alignment time is specified as the BT network clock. When the second link layer role switch procedure is performed with the BT network clock, the BT master and BT slave synchronize to that point, which as explained above was set to the expected alignment time based on the LTE frame. Thus, the second link layer role switch procedure can be used to synchronize the BT master and BT slave to a third point in time, more specifically, to the switch point between LTE transmit/receive based on the LTE frame.

If BT and LTE are already aligned, or if there is no active LTE connection, then the BT network clock is left as already set. There is no reason to update the BT network clock to LTE if there is no active LTE connection, or if BT and LTE are already aligned. In the situation that there is no active LTE connection, BT communications can proceed as normal without consideration of coexistence with an LTE connection. In the situation that the BT network clock is not already aligned to LTE, then successful BT communications may not occur until the BT network is retimed so that the next BT packet switchpoint aligns to the LTE frame.

Then, now that the BT connection is set up and the BT network clock is aligned (if necessary), the procedure 801 performs 815 BT transmission and reception. This can be done using ordinary techniques. It should be noted that the BT transmission and reception 815 that is aligned to LTE might drop transmission/reception pairs that experience interference that would otherwise have been successfully sent if there were no co-existence issue with the LTE.

That is, consider that BT is has packets A, B, C, D, E, F, G, H, I, J . . . to be sent. If there is no consideration of the effect of the LTE, the BT can send all of the master/slave packet pairs. However, the alignment of the BT network clock to the LTE frame can permit, for example, every third master/slave packet pair to be transmitted with the packet pairs between to be dropped thereby permitting the alignment, as follows: A, D, G, J, . . . . If the BT master/slave packet pairs are a typical handset/headset communications, this yields acceptable results for the user.

According to Bluetooth Specification Version 4.0, the role switch procedure is a method for swapping the roles of two devices connected in a piconet. The procedure involves moving from the physical channel that is defined by the original master device to the physical channel that is defined by the new master device. In the process of swapping from one physical channel to the next, the hierarchy of physical links and logical transports over the BR/EDR Controller are removed and rebuilt, with the exception of the ASB and PSB logical transports that are implied by the topology and are not preserved. The BT specification defines the role switch LMP procedure optionally to include a BT clock as a parameter in order to define a fixed synchronization point. The LMP_switch_req_PDU contains a parameter, switch instant, which specifies the instant at which the TDD switch is performed. This is specified as a Bluetooth clock value of the master's clock that is available to both devices. When the LMP_switch_req is received the switch instant is compared with the current master clock value; if it is in the future then an LMP_accepted PDU is returned assuming the role switch is allowed and a timer is started to expire at the switch instant; the role switch is initiated when the timer expires.

The term "legacy command," sometimes referred to as "legacy link layer command", refers to a role switch command that is used to set a BT alignment time of a switch point between Bluetooth master/slave packets to a LTE switch between transmit and receive. The legacy command can be specified in a BT Core Specification 4.0 or earlier, and consequently a BT device that is built according to BT Core Specification 4.0 or earlier (referred to as a "legacy" device) will recognize the legacy command and perform as specified. This is in comparison to a non-legacy command that was not specified in a BT Core Specification 4.0 or earlier such that a legacy device will not recognize the non-legacy command properly and thus will not necessarily perform as specified. Here, more specifically, the legacy command can be a role switch command, for example at the link layer of BT protocol layers, more especially a BT role switch procedure which includes the role switch command, and even more particularly can be a first link layer role switch command to switch the original master and slave designations and then a second link layer role switch command to switch back to the original master/slave designations.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include a cellular handset or device, a personal digital assistant, a personal assignment pad, and a personal computer equipped for wireless operation, a cellular handset or device, or equivalents thereof, provided such units are arranged and constructed for simultaneous operation in an LTE network and a BT network.

The communication systems and communication units of particular interest are those providing or facilitating voice communications services or data or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G, 3G and 4G systems such as UMTS (Universal Mobile Telecommunication Service) systems, Internet Protocol (IP) Wireless Wide Area Networks like 802.16, 802.20 or Flarion, integrated digital enhanced networks, LTE (Long Term Evolution), WiMAX 2 such as 802.16m, WiMAX 1, and 4G access technologies such as LTE Advanced, and variants or evolutions thereof.

Furthermore the wireless communication units or devices of interest may have short range wireless communications capability normally referred to as Bluetooth, such as specified in Bluetooth Core Specification version 4.0, earlier variations thereof, sometimes referred to as Classic Bluetooth, Bluetooth high speed protocol, Bluetooth low energy (WiBree) protocol, and later variations of Bluetooth, which can operate in connection with WLAN (wireless local area network) capabilities, such as IEEE 802.11 and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures.

It should be noted that the term network infrastructure device denotes a device for supporting communications with one or more wireless communication device, comprising one or more base stations which communicate with a central controller, and the like, and variants or evolutions thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication unit comprising:
 a BT transceiver;
 a LTE transceiver;
 a processor cooperatively operable with the BT transceiver, and configured to
  set up a BT connection over the BT transceiver;
  perform a legacy command to synchronize BT transactions over the BT connection to LTE frames in a LTE connection over the LTE transceiver, instead of waiting for the BT transactions to synchronize to the LTE frames, when the communication unit is acting as BT master, whereby a BT network clock is synchronized to LTE frames transmitted over the LTE transceiver.

2. The communication unit of claim 1, wherein the legacy command is a role switch command that is used to set a BT alignment time of a switch point between Bluetooth master/slave packets to a LTE switch between transmit and receive.

3. The communication unit of claim 1, wherein
 the legacy command is specified in a BT Core Specification 4.0 or earlier.

4. The communication unit of claim 1, wherein
 the legacy command comprises a first link layer role switch command to move to slave and then a second link layer role switch command to move to master.

5. The communication unit of claim 1, wherein
 the legacy command is a role switch command formatted according to a Bluetooth link layer standard.

6. The communication unit of claim 1, wherein
 the processor determines an expected alignment time to align BT master and slave packets to transmit and receive in the LTE frame based on a start time of the LTE frame, and
 the processor indicates the expected alignment time in the legacy command.

7. The communication unit of claim 1, wherein
 the processor determines an expected alignment time to align BT master and slave packets to transmit and receive in the LTE frame based on a start time of the LTE frame, and
 the legacy command is performed twice to switch the communication unit role to BT slave and then back to BT master while uploading the expected alignment time to the BT network clock.

8. A method for coexistence of BT and LTE networks on a same communication unit, comprising:
 setting up a BT connection over a BT transceiver on a communication unit;
 performing, on the communication unit, a legacy command to synchronize BT transactions over the BT connection to LTE frames in a LTE connection over an LTE transceiver on the communication unit, instead of waiting for the BT transactions to synchronize to the LTE frames, when the communication unit is acting as BT master, whereby a BT network clock is synchronized to LTE frames transmitted over the LTE transceiver.

9. The method of claim 8, wherein the legacy command is a role switch command that is used to set a BT alignment time of a switch point between Bluetooth master/slave packets to a LTE switch between transmit and receive.

10. The method of claim 8, wherein
 the legacy command is specified in a BT Core Specification 4.0 or earlier.

11. The method of claim 8, wherein
 the legacy command comprises a first link layer role switch command to move to slave and then a second link layer role switch command to move to master.

12. The method of claim 8, wherein
 the legacy command is a role switch command formatted according to a Bluetooth link layer standard.

13. The method of claim 8, further comprising
 determining, in the communication unit, an expected alignment time to align BT master and slave packets to transmit and receive in the LTE frame based on a start time of the LTE frame, and
 indicating the expected alignment time in the legacy command.

14. The method of claim 8, further comprising
 determining, in the communication unit, an expected alignment time to align BT master and slave packets to transmit and receive in the LTE frame based on a start time of the LTE frame, and
 performing the legacy command twice to switch the communication unit role to BT slave and then back to BT master while uploading the expected alignment time to the BT network clock.

15. A non-transitory computer-readable medium comprising instructions for execution by a computer, the instructions including a computer-implemented method for coexistence of BT and LTE networks on a same communication unit, comprising:
 setting up a BT connection over the BT transceiver;
 determining an expected alignment time to align BT master and slave packets based on a LTE frame based on a start time of a next LTE frame, and inserting the expected alignment time in a legacy command; and
 performing the legacy command with the expected alignment time to synchronize BT transactions over the BT connection to transmit and receive in the LTE frames in a LTE connection over the LTE transceiver.

16. The computer-readable medium of claim 15, wherein the legacy command is a role switch command that is used to upload the expected alignment time to the Bluetooth network clock.

17. The computer-readable medium of claim 15, wherein the legacy command is specified in a BT Core Specification 4.0 or earlier.

18. The computer-readable medium of claim 15, wherein the legacy command is a role switch command formatted according to a Bluetooth link layer standard.

19. The computer-readable medium of claim 15, wherein the legacy command comprises a first link layer role switch command to move to slave and then a second link layer role switch command to move to master.

20. The computer-readable medium of claim 15, further comprising
 performing the legacy command twice to switch the communication unit role to BT slave and then back to BT master while uploading the expected alignment time to the BT network clock.

* * * * *